April 14, 1970     B. R. MENNESSON     3,506,284
MOTOR CYCLE FRAME
Filed May 2, 1968                                      2 Sheets-Sheet 1
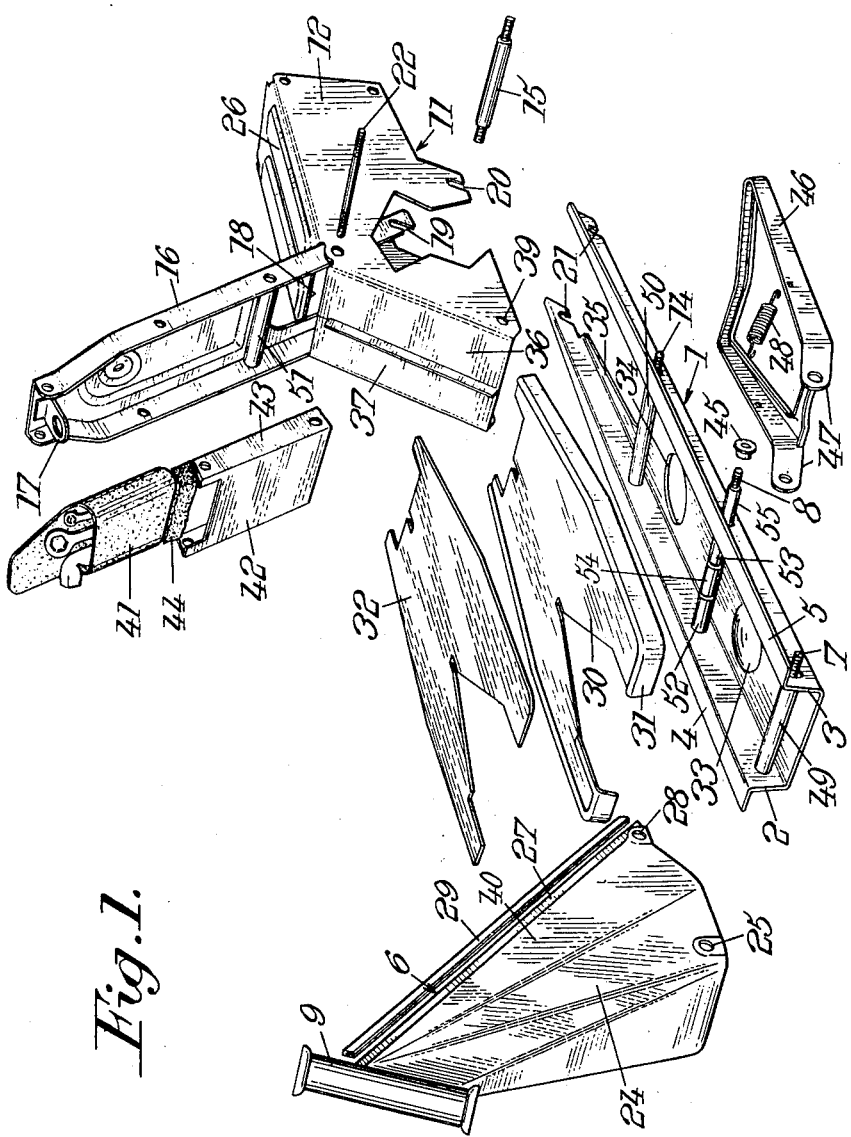
INVENTOR
*BERNARD RENÉ MENNESSON*
ATTORNEYS

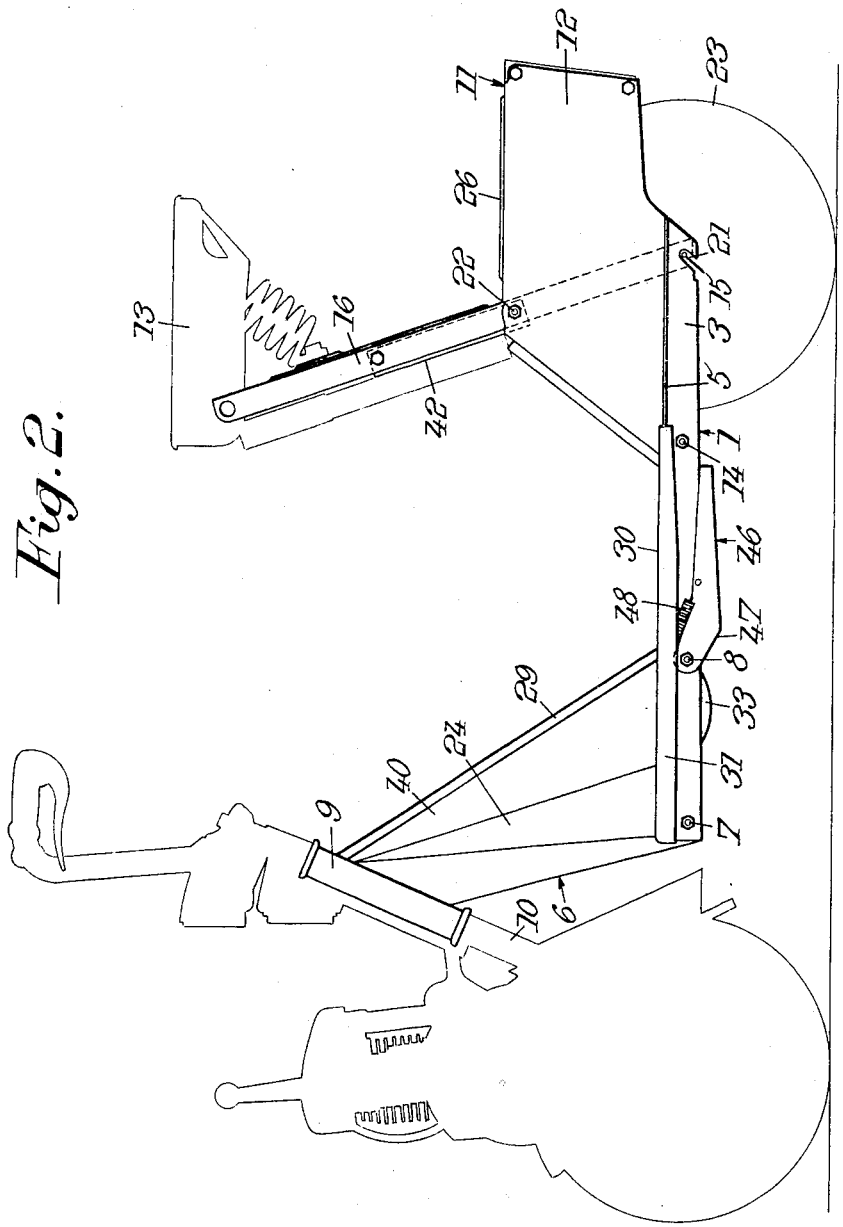

United States Patent Office 3,506,284
Patented Apr. 14, 1970

3,506,284
MOTOR CYCLE FRAME
Bernard René Mennesson, Neuilly-sur-Seine, France, assignor to Societe d'Appareils de Controle, et d'Equipement des Moteurs S.A.C.E.M., Neuilly-sur-Seine, France, a society of France
Filed May 2, 1968, Ser. No. 726,054
Claims priority, application France, May 11, 1967, 106,105
Int. Cl. B62k 3/02
U.S. Cl. 280—281                    7 Claims

ABSTRACT OF THE DISCLOSURE

The frame comprises a horizontal girder to which are fastened, at the front, by two parallel transverse rods, a leg formed of sheet metal bent in box-form and supporting a steering sleeve for the front fork, and, at the back, also by two parallel rods, one of which is formed by the axle of the rear wheel, a shell of sheet metal adapted to serve both as a rigid support for the saddle upright and as a mudguard for the rear wheel.

---

The present invention relates to motor cycle frames, of the type of those which comprise a horizontal part disposed between the wheels of the cycle and adapted to support the feet of the rider. The invention is more particularly, but not exclusively, concerned with frames of this type that are adapted to be equipped with wheels of small diameter, that is to say of exterior diameter at the most equal to 550 millimeters and in particular of the order of 300 millimeters.

The chief object of this invention is to provide frames of this type that can be manufactured easily, whose forms permit easy upkeep and whose lines are simple.

A frame according to the present invention is characterized by the fact that it comprises a horizontal girder to which is fastened, at the front, by two transverse parallel rods, a leg inclined to the horizontal, formed of sheet metal bent in box-form and supporting a steering sleeve receiving the front fork.

The invention will be easily understood from the following complementary description, as well as the accompanying drawings, of a preferred embodiment of a motor cycle frame constructed according to the invention, this embodiment being given merely by way of example.

In the accompanying drawings:

FIGURE 1 shows, in exploded perspective, partly cut away, a frame arranged according to the invention, and a stand and a tool-box co-operating with this frame;

And FIGURE 2 shows in profile, a motor cycle comprising the frame made of the elements of FIGURE 1, the frame itself as well as the stand and the tool-box being represented in heavy lines and the rest of the cycle in outline.

First of all, with regard to the frame as a whole, it comprises:

On the one hand, a horizontal girder 1, made of a sheet of metal bent in a U and comprising two substantially vertical lateral faces 2 and 3 whose upper edges are bent towards the exterior in a manner to form horizontal strips 4 and 5;

And on the other hand, a leg 6, fastened to the front of this girder 1 by two transverse parallel rods 7 and 8 passing through the bottom of the leg 6 and the faces 2 and 3 of the girder 1, this leg 6, formed of a sheet of metal bent in box-form whose contour will be specified hereafter, being inclined towards the front to the horizontal and supporting a steering sleeve 9 receiving the front fork 10.

The frame comprises, in addition, advantageously, a shell 11 made of a sheet of metal in the form of an upside down U whose flanks 12 are fastened to the rear of the girder 1 by the intermediary of a rod 14 and of the axle 15 of the rear wheel which passes through the faces 2 and 3 of the girder 1 and through the shell 11 in a transverse direction. The frame thus formed forms an ensemble, substantially symmetrical about the longitudinal vertical plane of the cycle.

The frame is completed by an upright 16 at the upper end of which is welded a bracket 17 adapted to maintain the front portion of the saddle 13 of the cycle. This upright 16 is formed by a sheet of metal in the form of a U open towards the front and inclined to the horizontal, and penetrates into the shell 11 through a hole 18 formed in this shell at the front part of its upper face 26. The bottom of the upright 16 is indented in the form of a fork along its entire lower part, that is to say along the part that penetrates into the shell 11, in order to permit the passage of the rear wheel 23. The upright 16 is fastened to the shell 11 by the two lower ends of its fork, which are provided with indentations 19 which, during mounting, become superimposed on indentations 20 and 21 cut out respectively from the flanks 12 of the shell 11 and from the lateral faces 2 and 3 of the girder 1, the ensemble of these superimposed indentations forming a passage for the axle 15 of the rear wheel. This axle is, in the usual manner, threaded at its ends to receive nuts (not shown) permitting the corresponding flanks of the upright 16, of the shell 11 and of the girder 1 to be pressed against each other, on each side of the rear wheel 23 housed in the shell. The upright 16, projecting out of the shell 11 through the hole 18, is also fastened to the shell 11, in the neighbourhood of this hole, by a transverse rod 22 threaded at its ends on both sides of the shell 11 and maintained by nuts (not shown).

As can be clearly seen in FIGURE 1, the leg 6 has a shape analogous to that of a heptagonal pyramid, and it is tapered towards the rear. This leg comprises notably two faces 24, symmetrical about the longitudinal vertical plane of the cycle, whose lower parts, provided with holes 25 forming the passage for the rod 7, are disposed in a manner to come into contact with the faces 2 and 3 of the girder 1 during mounting of the ensemble. The rear faces 40 of this leg 6 meet and are welded to form a ridge 27 situated in the longitudinal vertical plane of the cycle. The rear faces 40 are provided, in the neighbourhood of the lower end of the ridge 27, with holes 28 permitting the passage of the rod 8 during mounting. This ridge 27 is covered along its entire length by a joint-cover 29. The seven faces forming the leg 6 all converge towards the steering sleeve 9 to which this leg is welded.

The girder 1 is advantageously covered by a cover 30, provided with enveloping sides 31 and indented at its front and rear parts to permit the passage, on the one hand, of the tapered rear part of the leg 6, and on the other hand, of the shell 11. This cover is welded to the horizontal strips 4 and 5 of the girder 1 and it can be covered by a mat 32 made of a material having a high coefficient of friction.

The girder 1 advantageously comprises, at the front, a boss 33 adapted to increase its rigidity, and, in its intermediate part, a hole 34 which contributes to lighten the girder. Its rear part comprises an indentation 35 permitting the passage of the rear wheel 23. The shell 11 has a front face inclined to the horizontal and formed, for example, by folding towards the interior, sheet metal flaps 36 and 37 contiguous to the flanks 12 of this shell. These flaps are welded along a line passing through the longitudinal vertical plane of the cycle and the weld is covered by a joint-cover (not shown). The flanks 12 of the shell 11 are provided with holes 39 permitting the passage of the rod 14 during the fastening of this shell to the girder 1. The distance between the flanks 12 of the shell 11 corresponds to the distance that separates the lateral faces 2 and 3 of the girder 1.

A partially closed volume intended to receive a tool kit 41 is formed by providing a casing 42 having sides 43 which are fastened on the flanks of the upper part of the saddle upright 16. The fastening is assured by means of holes provided in the ends of the sides 43 and in the flanks of the U-shaped sheet metal forming the upright 16. For the lower fastening, the rod 22 already serving to fasten the upright 16 to the shell 11 is advantageously used. The upper fastening is made by means of bolts and nuts (not shown). At the bottom of the volume thus realized, there is disposed an elastic abutment 44 on which the tool kit 41 rests.

The rod 8, which already serves for fastening the rear of the leg 6 to the girder 1, advantageously carries, on both sides of this girder, between the tightening nuts and the lateral faces 2 and 3, rings 45 placed on this rod and permitting a stand 46, whose two branches 47 are pivotably mounted on the rings 45, to be moved between a retracted position and an active position in a known manner. A spring 48 maintains this stand in the retracted position when the cycle is being ridden.

In order to obtain a more precise and more resistant mounting, tubular braces 49, 50 and 51 are disposed around the transverse rods 7, 14 and 22. To the rod 8 correspond two brances 52 and 53 disposed on either side of the leg 6 and a brace 54 situated at the interior of the leg 6 between the holes 28. Before mounting, the cover 30 is welded to the girder 1 and the braces 52, 53 and 54, disposed in their respective places with respect to the leg 6, are maintained by a tubular support 55 whose exterior diameter is substantially equal to the interior diameter of the braces 52, 53 and 54, and whose length is greater than the length of the brace 54 so that, once introduced into the braces 52, 53 and 54, this support is in contact with the brace 54 and with parts of the braces 52 and 53. During mounting, the leg 6 is fastened to the girder 1 by the intermediary, on the one hand, of the rod 7 passing through the lateral faces 2 and 3 of the girder 1, the holes 25 of the leg 6 and the brace 49, and on the other hand, of the rod 8 passing through these lateral faces, the holes 28 of the leg 6, the braces 52, 53 and 54 and the tubular support 55.

The rods 7, 8, 14 and 22 (as well as the axle 15) are threaded at their ends, and once the leg 6 and the shell 11 are put in place, nuts (not shown), disposed on these ends, permit the fastening of the different parts of the frame to each other.

Such a frame has numerous advantages, in particular considerable simplicity of manufacturing and mounting, for it is composed of elements of simple forms easily obtainable by bending sheets of metal, and the mounting is done by bolting effected at very accessible places. The nuts used for this operation are advantageously of a single type. All the elements of the frame have a cross-section giving them high rigidity for low weight.

Another advantage of this frame resides in the pleasure of using it, due to the forms given to the various elements which compose this frame. The leg 6 has a form tapered towards the rear, which contributes to increasing the space available on the cover 30 for the feet of the rider. The shell 11 has a horizontal upper face 26 which can be used as a baggage carrier.

Various modifications of the frame described are possible. In particular, the girder 1 can, at least at its front part, be reduced to its lateral faces 2 and 3, arranged as stringers, so that the cycle motor—which, with the frame shown in the drawings, was mounted on the front fork (FIGURE 2)—can be fastened in part to the interior of the lower part of the leg 6 and in part between the stringers 2 and 3. In this case, the rods 7 and 8 (at least one of which can be replaced by two aligned bolts or screws) serve for the fastening of the motor on the frame.

What I claim is:
1. A motor cycle frame which comprises
a horizontal part adapted to be disposed between a front wheel and a rear wheel of the cycle, and adapted to support the feet of the rider, said horizontal part comprising a horizontal girder,
a leg inclined frontwardly and upwardly fastened to a front portion of said horizontal girder by two parallel transverse front rods, said leg being formed of sheet metal bent in box-form, and said leg supporting a steering sleeve adapted to receive a front fork.

2. A motor cycle frame according to claim 1, wherein a shell of sheet metal is fastened to a rear portion of said horizontal girder by two parallel transverse rear rods, one of which rear rods forms the rear axle for the rear wheel, said shell being adapted to serve, both as a rigid support for an upright mounted on said shell for carrying a saddle, and as a mudguard for the rear wheel.

3. A motor cycle frame according to claim 2, wherein said horizontal girder is formed by sheet metal in the shape of a U having two lateral faces bent to form strips, a cover, itself covered with a mat of a material having a high coefficient of friction, resting on said strips.

4. A motor cycle frame according to claim 3, wherein said leg is provided with a profile tapered towards the rear, which increases the space available at the front portion of said girder for the rider's feet.

5. A motor cycle frame according to claim 2, wherein said saddle-carrying upright is fastened at its lower end to said shell by means of said rear axle, said rear axle also serving for fastening the shell on said girder.

6. A motor cycle frame according to claim 5, wherein said saddle-carrying upright is formed by sheet metal in the form of a U open towards the front, said upright receiving a tool box, between the lateral faces of its U, at a portion of said upright outside said shell.

7. A motor cycle frame according to claim 2, wherein a movable stand is pivotably mounted on one of said front rods serving for fastening the leg on the girder.

References Cited

UNITED STATES PATENTS 2,768,005 10/1956 Mennesson _____ 280—291
3,275,339 9/1966 Mennesson _____ 280—281

FOREIGN PATENTS 165,182 6/1921 Great Britain.
194,801 3/1923 Great Britain.

KENNETH H. BETTS, Primary Examiner

U.S. Cl. X.R.

280—291